No. 845,099. PATENTED FEB. 26, 1907.
E. N. KLEIN.
OPHTHALMOSCOPE.
APPLICATION FILED JUNE 18, 1906.
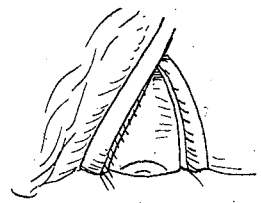
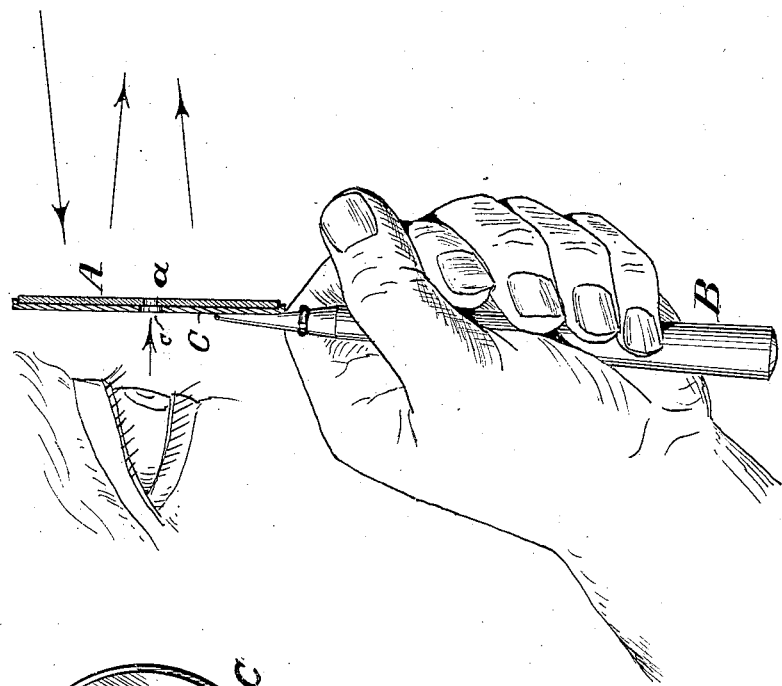
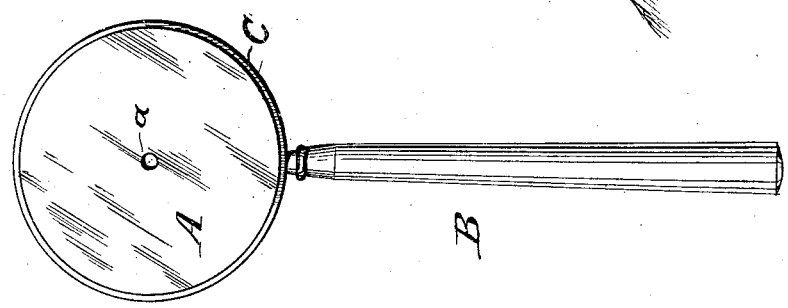
Attest
John Brenner.
T. LeBeau.
Inventor
Emanuel N. Klein
by C. Spengel atty.

UNITED STATES PATENT OFFICE.

EMANUEL N. KLEIN, OF CINCINNATI, OHIO.

OPHTHALMOSCOPE.

No. 845,099.    Specification of Letters Patent.    Patented Feb. 26, 1907.

Application filed June 18, 1906. Serial No. 322,147.

*To all whom it may concern:*

Be it known that I, EMANUEL N. KLEIN, a citizen of the United States, residing at Cincinnati, Hamilton county, State of Ohio, have invented certain new and useful Improvements in Ophthalmoscopes; and I do declare the following to be a clear, full, and exact description thereof, attention being called to the accompanying drawings, with the reference characters marked thereon, which form also part of this specification.

This invention relates to improvements in certain instruments usually employed by opticians and oculists for the purpose of examining the interior of the eye and generally known under the names of "ophthalmoscopes," "skiascopes," or "retinascopes." They consist, substantially, of a reflector in form of a mirror, whereby light is thrown into the eye to illuminate the interior thereof to permit observation, which is through a small opening in said mirror. The intense action of light so reflected into the eye is quite trying in most cases, even in normal and healthy eyes, but more so in case of weak eyes or of sensitive ones or where disease of the retina exists. Satisfactory examination in such cases is very much interfered with and sometimes rendered impossible because of the unintentional twitching and movements of the patient due to the strong irritation, which causes also involuntary contraction of the pupil, which cannot be controlled. These disturbing effects are largely due to the presence of the ultra-violet rays of the light, which form also an element of the reflected light. The object of my invention is to counteract these disturbing effects as much as possible by rendering the reflected light non-irritating by removing therefrom the disturbing qualities of the same. This is done by acting more particularly upon the ultra-violet rays of the light, which I do by means of the mirror, so that they are prevented from being reflected by the same into the eye. This I accomplish, substantially, by changing the light received by the mirror of the instrument by imparting to the same certain qualities, so that the objectionable elements of the light after received by the mirror are suppressed therein and not transmitted by it. For such purpose I use colored glass for the body of the mirror and particularly such of yellow color or of related shades and tints, like orange or amber, for instance. This color in particular is soothing for the eye and neutralizes the objectionable effects of the ultra-violet rays.

In the accompanying drawings I have illustrated my invention in connection with a customary plain ophthalmoscope or skiascope; but the same is of course applicable to all similar instruments involving the use of a mirror for the reflection of light into the eye.

In the drawings, Figure 1 is a front view, and Fig. 2 is a section, of the instrument.

A shows the mirror, and *a* the observation-opening through the same. C is the casing, into which this mirror is set with the film-covered side or reflecting-surface inside—that is, next to the casing. *c* is an opening in the center of this latter, which registers with opening *a* in the mirror. This casing is attached to the handle B, by which the instrument is held to receive the light and whereby it is manipulated at the same time to reflect the light into the eye to be examined. This mirror A, as before stated, I make of a material which has qualities affecting the objectionable ultra-violet rays of the light in a manner that they form no part of the light which is reflected into the eye. The most preferable material for this purpose is glass having the color of yellow or its related tints, as before stated.

The disturbing elements—to wit, the rays mentioned—being neutralized and absorbed, and thereby prevented from reaching the interior of the eye, all irritating influences which interfere with a satisfactory examination are at once removed, and as a matter of fact the facilities for making a successful examination are greatly enhanced, since only non-irritating light is now reflected into the eye.

The pupil instead of involuntarily contracting as it did formerly in view of the irritating light remains large and rather dilates now under the influence of the soothing light, thus disclosing a larger area of the interior of the eye and increasing the field accessible for observation.

The removal of these objectionable elements from the light permits also use of larger mirrors and stronger lights, thus obtaining better results as heretofore possible.

Having described my invention, I claim as new—

1. An ophthalmoscope or similar instrument provided with a reflecting-mirror which has qualities whereby the ultra-violet rays of the light received by the mirror are affected so as to be prevented from leaving the mirror by reflection.

2. An ophthalmoscope or similar instrument provided with a reflecting-mirror which is made of glass which is colored for the purpose of acting upon certain elements of the light, received by it, to prevent such elements from leaving the mirror by reflection.

3. An ophthalmoscope or similar instrument provided with a reflecting-mirror which is made of glass, having a color which is yellow, and whereby the ultra-violet rays of this light, received by the mirror are neutralized by absorption and prevented from being reflected by the mirror.

In testimony whereof I hereunto affix my signature in the presence of two witnesses.

EMANUEL N. KLEIN.

Witnesses:
C. SPENGEL,
T. LE BEAU.